United States Patent
Shima et al.

(10) Patent No.: US 6,366,964 B1
(45) Date of Patent: Apr. 2, 2002

(54) METHOD OF AND APPARATUS FOR DYNAMICALLY ENUMERATING OBJECTS REPRESENTING DEVICES WITHIN AN IEEE 1394 SERIAL BUS NETWORKING

(75) Inventors: Hisato Shima; Sho Kou, both of Saratoga; Chenchu Chilamakuri, Fremont; Qi Hu, Santa Clara; Ratna Vemuri, San Jose, all of CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/177,665

(22) Filed: Oct. 22, 1998

(51) Int. Cl.[7] .............................. G06F 3/00; G06F 13/00

(52) U.S. Cl. ........................................................ 710/8

(58) Field of Search ........................... 710/15, 8, 9, 10, 710/104

(56) References Cited

U.S. PATENT DOCUMENTS

| | | | |
|---|---|---|---|
| 5,414,806 A | * 5/1995 | Richards | 395/135 |
| 5,446,900 A | 8/1995 | Kimelman | 395/700 |
| 5,657,448 A | * 8/1997 | Wadsworth et al. | 709/220 |
| 5,764,930 A | * 6/1998 | Staats | 710/107 |
| 5,872,973 A | * 2/1999 | Mitchell et al. | |
| 5,896,530 A | 4/1999 | White | 395/671 |
| 5,907,704 A | 5/1999 | Gudmundson et al. | 395/701 |
| 5,966,707 A | 10/1999 | Van Huben et al. | 707/10 |
| 5,978,579 A | * 11/1999 | Buxton et al. | 395/701 |

OTHER PUBLICATIONS

IEEE, "P1394 Standatd for a High Performance Serial Bus," Draft 8.0v2, 1995, USA.
1394 Trade Association "AV/C Digital Interface Command Set General Specification" Version 3.0, Apr. 15, 1998 USA.

* cited by examiner

Primary Examiner—Ario Etienne
(74) Attorney, Agent, or Firm—Haverstock & Owens LLP

(57) ABSTRACT

A controlling application utilizes existing handle objects, as appropriate, to reconfigure objects to dynamically enumerate and represent devices coupled to a serial bus network after a bus reset event. Preferably, the serial bus network is an IEEE 1394-1995 serial bus network. During a self-identifying process, after the bus reset, information about the characteristics of the devices within the network is received. From this self-identifying information objects representing the devices are generated. Existing handle objects from a previous bus configuration are then compared to these objects. If a handle matches an object, then a pointer value within the handle is changed to point to an address of the object. Preferably, a handle includes a 64 bit unique identifier value that is compared to the objects to find a match. For devices removed from the network, the handle object is preferably never discarded but is made invalid. For devices added to the network, existing invalid handle objects are preferably re-validated and attached to objects representing devices. If there are no further existing handles and a device does not yet have an attached handle, then a handle is generated and attached to the device. A handle is only generated if there are more devices within the network than there are existing handles. Preferably, a handle includes a pointer value pointing to an address of the corresponding object for the device.

25 Claims, 6 Drawing Sheets

METHOD OF AND APPARATUS FOR DYNAMICALLY ENUMERATING OBJECTS REPRESENTING DEVICES WITHIN AN IEEE 1394 SERIAL BUS NETWORKING

FIELD OF THE INVENTION

The present invention relates to the field of enumerating devices within a bus structure. More particularly, the present invention relates to the field of dynamically enumerating devices within a bus structure after a bus reset.

BACKGROUND OF THE INVENTION

The IEEE standard, "IEEE 1394 Standard For A High Performance Serial Bus," Draft ratified in 1995, is an international standard for implementing an inexpensive high-speed serial bus architecture which supports both asynchronous and isochronous format data transfers. Isochronous data transfers are real-time transfers which take place such that the time intervals between significant instances have the same duration at both the transmitting and receiving applications. Each packet of data transferred isochronously is transferred in its own time period. The IEEE 1394-1995 standard bus architecture provides multiple channels for isochronous data transfer between applications. A six bit channel number is broadcast with the data to ensure reception by the appropriate application. This allows multiple applications to simultaneously transmit isochronous data across the bus structure. Asynchronous transfers are traditional data transfer operations which take place as soon as possible and transfer an amount of data from a source to a destination.

The IEEE 1394-1995 standard provides a high-speed serial bus for interconnecting digital devices thereby providing a universal I/O connection. The IEEE 1394-1995 standard defines a digital interface for the applications thereby eliminating the need for an application to convert digital data to analog data before it is transmitted across the bus. Correspondingly, a receiving application will receive digital data from the bus, not analog data, and will therefore not be required to convert analog data to digital data. The cable required by the IEEE 1394-1995 standard is very thin in size compared to other bulkier cables used to connect such devices. Devices can be added and removed from an IEEE 1394-1995 bus while the bus is active. If a device is so added or removed the bus will then automatically reconfigure itself for transmitting data between the then existing nodes. A node is considered a logical entity with a unique address on the bus structure. Each node provides an identification ROM, a standardized set of control registers and its own address space.

Each node on the IEEE 1394-1995 bus structure has a 16 bit node ID. The node ID is the address that is used for data transmission on the data link layer. This allows address space for potentially up to 64K nodes on the bus structure. The node ID is divided into two smaller fields: the higher order 10 bits specify a bus ID and the lower order 6 bits specify a physical ID. The bus ID is assigned by a root node and the physical ID is assigned during a self identify sequence upon reset of the bus. Each physical ID field is unique within a single IEEE 1394-1995 bus, but the physical ID field is not a fixed value for each node itself. The physical ID field is fixed for the position of the node within the bus structure. If a device is moved from one position in the IEEE 1394-1995 bus to another position within the same IEEE 1394-1995 bus, the device will have a different node ID because its physical ID will have a different value when in the new position.

Within each of the bus ID and physical ID fields a value of all logical "1"s is reserved for special purposes. Accordingly, this addressing scheme provides for up to 1023 busses, each with 63 independently addressable nodes. Each IEEE 1394-1995 compatible device includes a node unique ID which is a 64 bit number saved within a configuration read-only memory (ROM) of the device. The node unique ID is permanent for each device and does not depend on the position of the device within an IEEE 1394-1995 bus. The node unique ID is not used for addressing of data transmissions on the data link layer.

The IEEE 1394-1995 standard defines a protocol as illustrated in FIG. 1. This protocol includes a serial bus management block 10 coupled to a transaction layer 12, a link layer 14 and a physical layer 16. The physical layer 16 provides the electrical and mechanical connection between a device or application and the IEEE 1394-1995 cable. The physical layer 16 also provides arbitration to ensure that all devices coupled to the IEEE 1394-1995 bus have access to the bus as well as actual data transmission and reception. The link layer 14 provides data packet delivery service for both asynchronous and isochronous data packet transport. This supports both asynchronous data transport, using an acknowledgement protocol, and isochronous data transport, providing real-time guaranteed bandwidth protocol for just-in-time data delivery. The transaction layer 12 supports the commands necessary to complete asynchronous data transfers, including read, write and lock. The serial bus management block 10 contains an isochronous resource manager for managing isochronous data transfers. The serial bus management block 10 also provides overall configuration control of the serial bus in the form of optimizing arbitration timing, guarantee of adequate electrical power for all devices on the bus, assignment of the cycle master, assignment of isochronous channel and bandwidth resources and basic notification of errors.

A bus reset occurs when the bus is somehow reconfigured, either by the removal of a node from the bus or the addition of a node to the bus or when a device attached to the bus is powered off. When a bus reset occurs, all nodes are forced into a special state that clears all topology information and starts a next phase. After a bus reset, the only information known to a node is whether the node is a branch node, a leaf node or an isolated node. A branch node has more than one directly connected neighbor. A leaf node has only a single neighbor. An isolated node is unconnected. After a bus reset, a tree identification process is performed. During the tree identification process, the general network topology is determined and translated into a tree. One node within the network is designated as a root node and all of the physical connections are associated with a direction pointing towards the root node. From each port it is determined if there is a connection and if the connection is to a child or parent node. The direction is set by labeling each connected port as either a parent port or a child port. A parent port is a port connected to a node closer to the root than the reporting node. A child port is a port connected to a node further from the root than the reporting node. From these relationships, the root node determines the physical topology of the devices connected to the IEEE 1394-1995 serial bus network.

After the tree identification process, a self identifying process is performed. During the self identifying process, each node connected to the IEEE 1394-1995 serial bus network selects a unique physical ID, in order, and transmits that physical ID and other management information to the other nodes on the bus. The physical ID is a number equal to the count of the number of times since the reset event that a node has passed through the state of receiving self identifying information before having its own opportunity to send self identifying information. This self identifying process allows a node connected to the IEEE 1394-1995 serial bus network to be aware of the other nodes connected to the bus.

A controlling or monitoring application is an application that is resident on a node and is used to monitor, control or interact with the other nodes coupled to the IEEE 1394-1995 serial bus network. Generally, such a controlling or monitoring application maintains a representation or object of each device. This object represents the capabilities of the device. This object is typically copied from a library of objects representing known devices. However, if a new device, without a representative object in the library, is connected to the network, the controlling or monitoring application is at a loss for representing this new device. This can result in the controlling or monitoring application being unable to monitor or interact with the new device.

A reset event signifies to the controlling or monitoring application that the status of the bus and the nodes connected to it has changed. This requires the controlling or monitoring application to somehow update its information regarding the devices connected to the serial bus network. This can be a significant endeavor. There is currently a lack of efficient apparatus and methods for updating information for nodes on a serial bus network after a bus reset. No solutions for handling the updating of device information after a bus reset is described in any of the IEEE 1394 standards documents.

SUMMARY OF THE INVENTION

A controlling application utilizes existing handle objects, as appropriate, to reconfigure objects to dynamically enumerate and represent devices coupled to a serial bus network after a bus reset event. Preferably, the serial bus network is an IEEE 1394-1995 serial bus network. During a self-identifying process, after the bus reset, information about the characteristics of the devices within the network is received. From this self-identifying information objects representing the devices are generated. Existing handle objects from a previous bus configuration are then compared to these objects. If a handle matches an object, then a pointer value within the handle is changed to point to an address of the object. Preferably, a handle includes a 64 bit unique identifier value that is compared to the objects to find a match. For devices removed from the network, the handle object is preferably never discarded but is made invalid. For devices added to the network, existing invalid handle objects are preferably re-validated and attached to objects representing devices. If there are no further existing handles and a device does not yet have an attached handle, then a handle is generated and attached to the device. A handle is only generated if there are more devices within the network than there are existing handles. To generate an object representing a device, subobjects for each subunit within the device are assembled into the object representing the device. When the unit reports its self-identifying information, the controlling application determines which subunits are included within the unit. Subobjects representing these subunits are copied from a subobject library and assembled into the object representing this device. Preferably, a handle includes a pointer value pointing to an address of the corresponding object for the device.

In one aspect of the invention, a method of dynamically enumerating devices within a network comprises the steps of comparing self identifying information for each device within the network to one or more existing handle objects and reconfiguring the existing handle objects to correspond to the devices within the network after a bus reset, wherein valid handle objects are associated with device objects generated after the bus reset. The valid handle objects each include a pointer value pointing to an address of a corresponding device object after the bus reset. Each device object represents characteristics of a corresponding device. The method further comprises the step of receiving self identifying information for each device within the network. The method further comprises the step of generating the device objects for each device within the network. The network is preferably an IEEE 1394 serial bus network.

In another aspect of the present invention, an apparatus for dynamically enumerating devices within a network comprises means for comparing self identifying information for each device within the network to one or more existing handle objects and means for reconfiguring coupled to the means for comparing for reconfiguring the existing handle objects to correspond to the devices within the network after a bus reset, wherein valid handle objects are associated with device objects generated after the bus reset. The apparatus further comprises an interface circuit coupled to the means for comparing to receive the self identifying information from the devices within the network. Each handle includes a pointer value corresponding to an address of a corresponding device object. Each device object represents characteristics of a corresponding device. The network is preferably an IEEE 1394 serial bus network.

In still another aspect of the present invention, a network comprises a plurality of devices coupled together, each of the devices includes an interface circuit through which communications are transmitted and received, and a processing circuit coupled to the interface circuit to process communications received through the interface circuit and a control application resident on one of the devices to maintain representations of the devices, wherein the representations are reconfigured by the control application after a bus reset using existing handles existing before the bus reset which correspond to devices remaining after the bus reset. The representations include device objects each representing characteristics of a corresponding device. Each handle includes a pointer value corresponding to an address of a corresponding device object. The network is preferably an IEEE 1394 serial bus network.

In yet another aspect of the present invention, a method of dynamically enumerating a device within a network comprises the steps of determining characteristics of a device, generating a device object for the device, determining if an existing valid handle matches the characteristics of the device, wherein the existing valid handle includes a pointer value and changing the pointer value to an address of the device object if the existing valid handle matches the characteristics of the device. The existing valid handle further includes a unique ID value of the device. The step of determining if any existing valid handle matches the characteristics of the device compares the unique ID value of the device to the unique ID value stored in the handle. The method further comprises the step of repeating the above steps for each device within the network. For a new device added to the network, an existing invalid handle is re-validated and associated with a corresponding device object, if the existing invalid handle is available. If no existing invalid handle is available, a new handle is generated for and associated with the new device. For a device removed from the network, a corresponding handle is changed to an invalid handle. Each device object represents characteristics of a corresponding device. The method further comprises the step of receiving self-identifying information for the device. The network is preferably an IEEE 1394 serial bus network.

DETAILED DESCRIPTION OF THE PREFERRED EMBODIMENT

Figure 1:
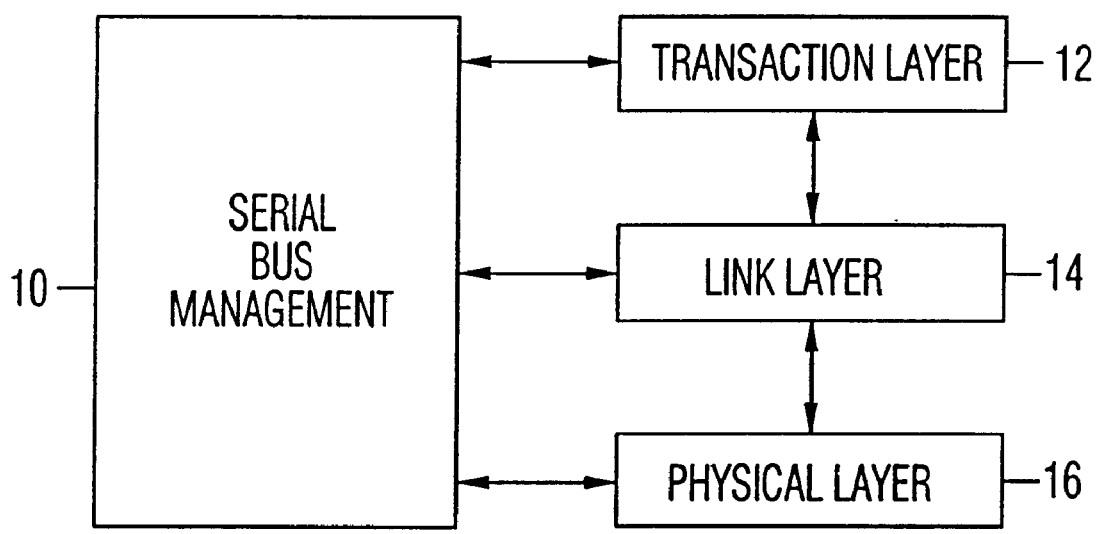
FIG. 1 is a prior art illustration of a protocol of the IEEE 1394-1995 standard.

A node including a monitoring or control application which monitors the status, availability and configuration of the nodes on the IEEE 1394-1995 serial bus maintains objects for each node coupled to the IEEE 1394-1995 serial bus. One or more such monitoring or controlling applications can be included within an IEEE 1394-1995 serial bus network of devices. An object represents the functions and capabilities of a device or unit and is assembled from information provided by the unit during the self identifying process after a bus reset. If a unit includes subunits, then the object is formed from a combination of subobjects, each representing a subunit. The subobjects are copied from a subobject library and assembled into the object representing the unit.

Preferably, the object includes the unique ID value for the device. A handle object corresponding to the object is then maintained and associated by the controlling application with the device. Preferably, the handle object includes a 64 bit global unique identifier value designating the corresponding device. The handle includes a pointer value pointing to the address of the object for that node. A bus reset occurs when the configuration of the nodes within the IEEE 1394-1995 serial bus network changes. Accordingly, the objects and handles representing devices within the network must somehow be updated after a bus reset to reflect the current state of the nodes coupled to the IEEE 1394-1995 serial bus network. One method of updating the objects and handles, is to discard all of the objects and handles after a bus reset and re-generate both the objects and handles representing the nodes coupled to the IEEE 1394-1995 serial bus network after the bus reset. This is not preferred because it is time consuming and inefficient. Once a network of devices is configured and set up, the network configuration will only change when a device is added or removed. In most networks this is not a relatively frequent occurrence. When a bus reset does occur, the network usually only changes with the addition or removal of a single device.

Recognizing that most network configurations do not change very often and then usually only with the addition or removal of a single device, the preferred embodiment of the present invention reconfigures the objects and handles representing the nodes coupled to the IEEE 1394-1995 serial bus network after a bus reset, utilizing the existing handles from the bus configuration previous to the bus reset event. During the self-identifying process, information about the characteristics of the devices within the network is received. From this self-identifying information, objects representing the devices are generated. Existing handles from the previous bus configuration are then compared to the characteristics of the devices within the network after the bus reset. If a handle matches an object, then the handle is attached to the object and a pointer value within the handle is changed to point to an address of the object. Preferably, a handle includes the 64 bit unique identifier value that is compared to the objects to find a match. If a device is removed, the handle object corresponding to that device is preferably never discarded, but is made invalid. If a device is added to the network, an existing invalid handle object is preferably re-validated and attached to the object for the device. If there are no remaining handles, then a handle is generated and attached to the device. Preferably, the handles for removed devices are not discarded, but only made invalid. If a new device is added and an existing invalid handle is available, then that handle is utilized to point to the new device. Accordingly, a new handle is preferably only generated when a new device is added and there are no remaining available handles.

During the self identifying process, after a bus reset event, each device transmits its self identifying information in response to a query from the monitoring application, including its characteristics, unique ID and physical ID, on the IEEE 1394-1995 serial bus structure. In the preferred embodiment of the present invention, when the node on which the monitoring or controlling application is running receives the self identifying information from the devices, the application generates objects representing each device, as described below. Existing handles are then compared to the generated objects. If the unique ID value within an object matches one of the existing handles, then the matching handle is attached to the object by changing the pointer value within the matching handle to include the address of the object. Otherwise, if the unique ID value within an object does not match the unique ID value within any existing valid handle, then if an invalid handle exists, that handle is changed to a valid state and attached to the object by changing the pointer value within the handle to include the address of the object. If the unique ID value within an object does not match the unique ID value within any existing valid handle and no invalid handle exists, then a handle is generated and attached to the object by including the address of the object as the pointer value. The unique ID value of the device is also inserted into the handle.

Within the preferred embodiment, the application maintains the handles and reuses them after a bus reset. This allows the application to reuse handles after a bus reset which existed before the bus reset. Each handle then includes the pointer value pointing to the address of the object corresponding to the device.

Figure 2:
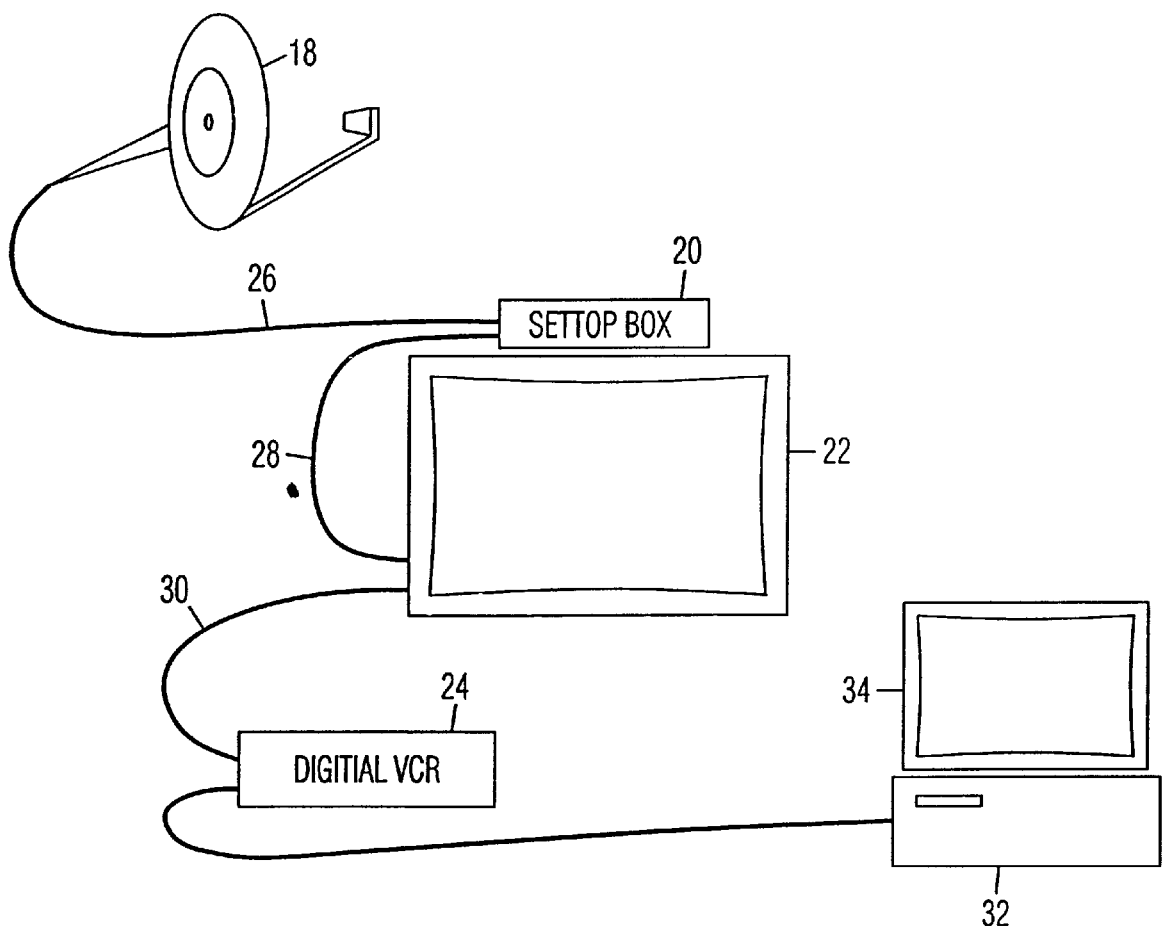
FIG. 2 illustrates an exemplary IEEE 1394-1995 serial bus network including a satellite dish, settop box, television, digital VCR and a computer system.

An exemplary IEEE 1394-1995 consumer entertainment system network including a computer system, settop box, satellite dish, television and digital video cassette recorder (VCR) is illustrated in FIG. 2. The settop box 20 is coupled to receive broadcast transmissions from the satellite dish 18 by the IEEE 1394-1995 cable 26. Typically, these broadcasts are transmitted from the satellite dish 18 to the settop box 20 in an MPEG format. The settop box 20 is coupled to the television 22 by the IEEE 1394-1995 cable 28. The television 22 is coupled to the digital VCR 24 by the IEEE 1394-1995 cable 30. The digital VCR 24 is coupled to the computer system 32 by the IEEE 1394-1995 cable 36. The computer system 32 includes a corresponding display 34.

This configuration illustrated in FIG. 2 is exemplary only. It should be apparent that an audio/video network could include many different combinations of physical components. The physical devices within such an IEEE 1394-1995 network are autonomous devices, meaning that in an IEEE 1394-1995 network, as the one illustrated in FIG. 2, in which a computer is one of the devices, there is not a true "master-slave" relationship between the computer and the other devices. In many IEEE 1394-1995 network configurations, a computer may not even be present. Even in such configurations, the devices within the network are fully capable of interacting with each other on a peer basis.

Figure 3:
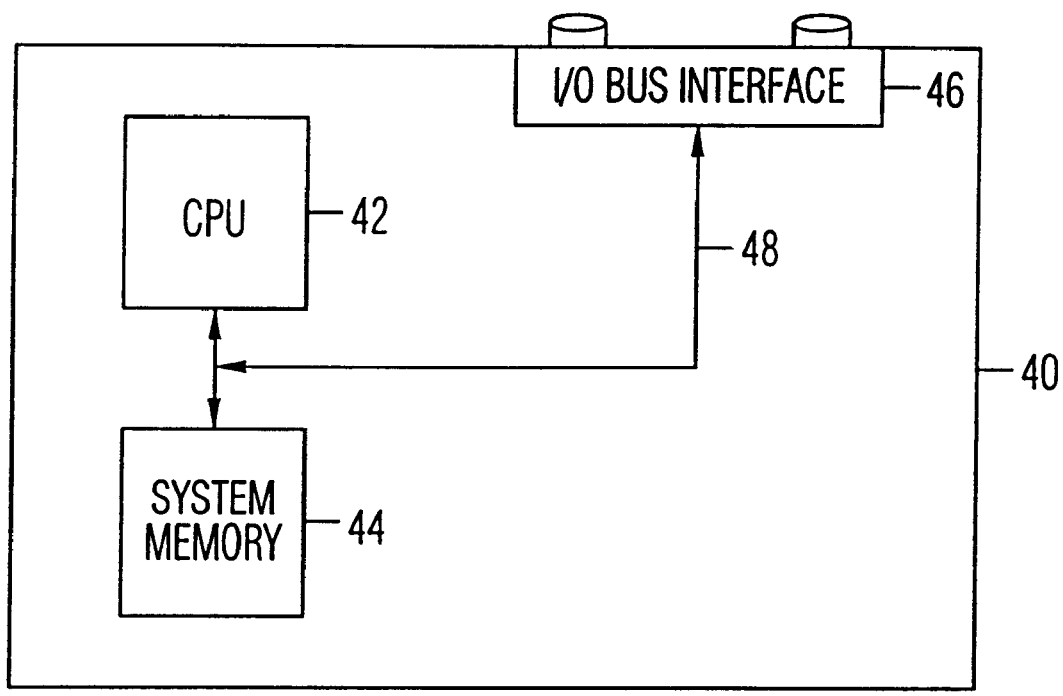
FIG. 3 illustrates a block diagram of a hardware system resident in each device implementing and maintaining a controlling application according to the preferred embodiment of the present invention.

A block diagram of a hardware system resident in a node running a monitoring or controlling application according to the present invention is illustrated in FIG. 3. A printed circuit board 40 is included in the hardware system illustrated in FIG. 3. The printed circuit board 40 includes a central processing unit (CPU) 42 coupled to system memory 44 and to an I/O bus interface 46 by the system bus 48. The use of the term 'CPU' is not intended to imply that such a system must be a general purpose computing circuit. Rather, this circuit could be implemented with a general purpose controller or special purpose circuit. Within the examples discussed above, the monitoring or controlling application of the present invention is running on the computer system 32. However, it should be apparent to those skilled in the art that the monitoring or controlling application of the present invention can be run on any appropriately configured device.

Dynamic Enumeration Of Devices After Bus Reset

After a bus reset event the monitoring or controlling application of the present invention dynamically enumerates the devices coupled to the IEEE 1394-1995 serial bus network, utilizing the existing handles from the bus configuration previous to the bus reset. This enumeration process after a bus reset is dynamic and is preferably performed utilizing the self-identifying information from each of the devices coupled to the IEEE 1394-1995 serial bus network.

Figure 4:
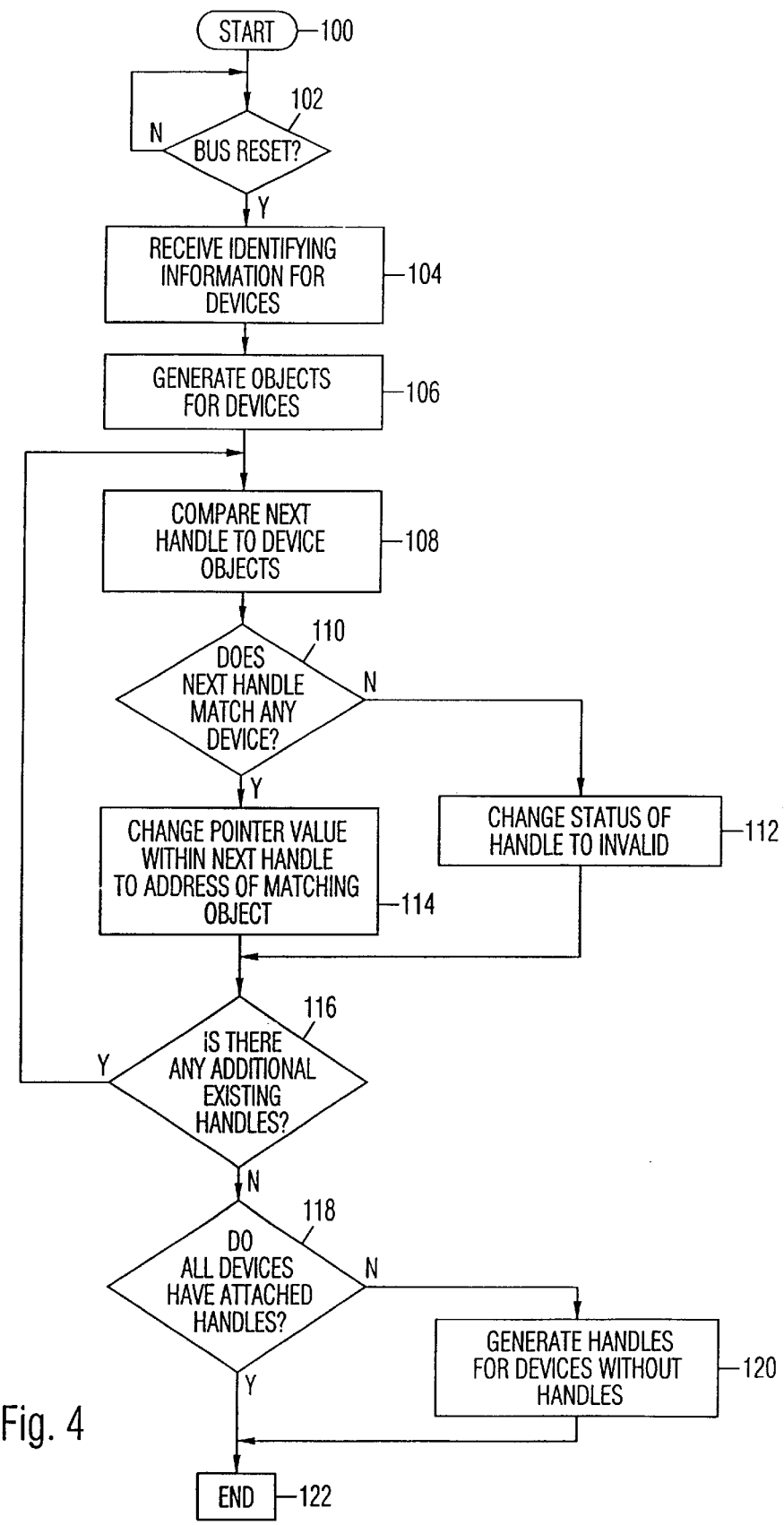
FIG. 4 illustrates a flow diagram of the preferred steps within the dynamic enumeration method of the preferred embodiment of the present invention.

A flowchart showing the preferred steps within the dynamic enumeration method of the preferred embodiment of the present invention is illustrated in FIG. 4. The preferred method begins at the step 100. At the step 102, it is determined if a bus reset event has occurred. Once a bus reset event occurs, the self-identifying information for the devices is received, at the step 104, in response to a query by the monitoring application. Utilizing this self-identifying information, objects for the devices within the network after a bus reset, are generated at the step 106. A next handle is compared to the generated objects at the step 108. Preferably, the next handle is compared by comparing the unique ID value within the handle to the unique ID value within the generated objects. At the step 110 it is determined if the next handle matches any of the devices currently within the network. If the handle does not match any of the devices currently within the network, then the status of the handle is changed to invalid, at the step 112. Otherwise, if the next handle does match one of the devices currently within the network, the next handle is attached to the matching object by changing the pointer value within the next handle to correspond to the address of the matching object, at the step 114. After completion of either the step 112 or the step 114, it is then determined at the step 116, if there are any additional existing valid handles. If there are additional existing valid handles, then the application repeats the steps 108–114 for each existing valid handle. After all existing valid handles have been compared to the general objects, it is then determined at the step 118, if all of the generated objects have attached handles. If all of the generated objects do not have attached handles, then handles are associated with the unattached objects, at the step 120, by first utilizing existing invalid handles and then generating new handles, if necessary. Once all of the generated objects are associated with handles, the process ends at the step 122.

In this manner, the existing handles are reconfigured and reassociated with objects, as appropriate, to represent the devices included within the network after the bus reset event. Handles corresponding to a device which has been removed from the network and which are not utilized after the bus reset are placed into an invalid state.

When a new device is added to the network, if an existing invalid handle is available, it is placed into a valid state and associated with that device by changing the pointer value within the handle to correspond to the address of the device. If no existing handles are available, then a handle is generated and associated with the new device. When a device is removed from the network leaving an extra handle, that handle is preferably retained and placed into the invalid state. Alternatively, the extra handle is discarded.

Dynamic Binding To Generate Objects

In order to generate objects representing many differently configured devices, even devices which do not exist at the time of development of the controlling application, the controlling application utilizes subobjects, representing subunits, and assembles these subobjects into an object representing a unit. As long as the unit is made up of known subunits then the unit can be represented by the dynamic binding process of the present invention. Each physical device or unit is a combination of subunits. For example, a typical commercially available video camera includes multiple subdevices, implementing different functionalities, such as the camera and the video player. A dual audio tape deck includes two tape deck subdevices. A compact disc (CD) player includes a single CD player subdevice.

As described above, one method of representing physical devices with objects is to maintain a library of objects representing known devices. However, once a new device is generated which is not represented within the library of objects, the controlling or monitoring application will be unable to represent this new device, because an object for this device will be unavailable. In order to have the capability to represent any unit which includes known subunits, the controlling or monitoring application of the present invention receives the self-identifying information for a unit, after a query from the monitoring application, and determines which subunits are included within the unit. As an example, when the video camera discussed above, sends its self-identifying information, the controlling application determines that the video camera includes two subunits, the camera and the video player. The controlling application then copies subobjects, representing these two subunits, from the subobject library and assembles the subobjects into the object representing this video camera.

Figure 5:
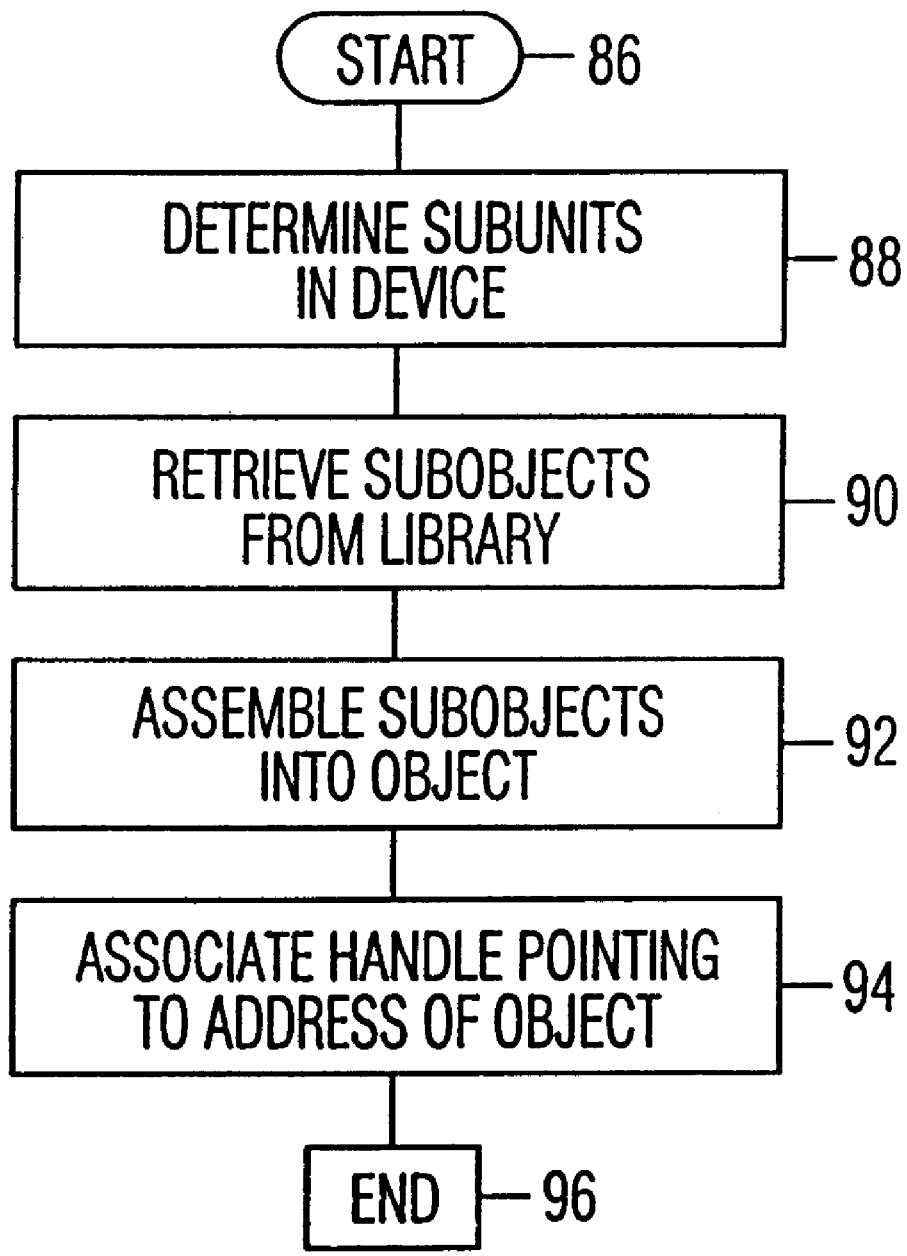
FIG. 5 illustrates a flow diagram of the preferred steps within the dynamic binding method of the preferred embodiment of the present invention.

A flow diagram representing the preferred steps involved in generating objects and corresponding handles, according to the present invention, is illustrated in FIG. 5. The method starts at the step 86. The self-identifying information for the current reporting unit is then examined to determine the subunits within the unit, at the step 88. Once the included subunits are determined, the representative subobjects corresponding to the included subunits are retrieved from the subobject library maintained by the application, at the step 90. At the step 92, the retrieved subobjects are combined to form the object representing the current reporting unit. A handle is then associated with the device at the step 94. The handle includes a pointer value pointing to the address of the corresponding object. The method ends at the step 96 after the object and handle have been generated.

Preferably, the subobject library and the objects and handles representing the devices currently coupled within the IEEE 1394-1995 serial bus network, are stored within the system memory 44. Alternatively, the subobject library, objects and handles can be stored within any appropriate available memory.

Figure 6:
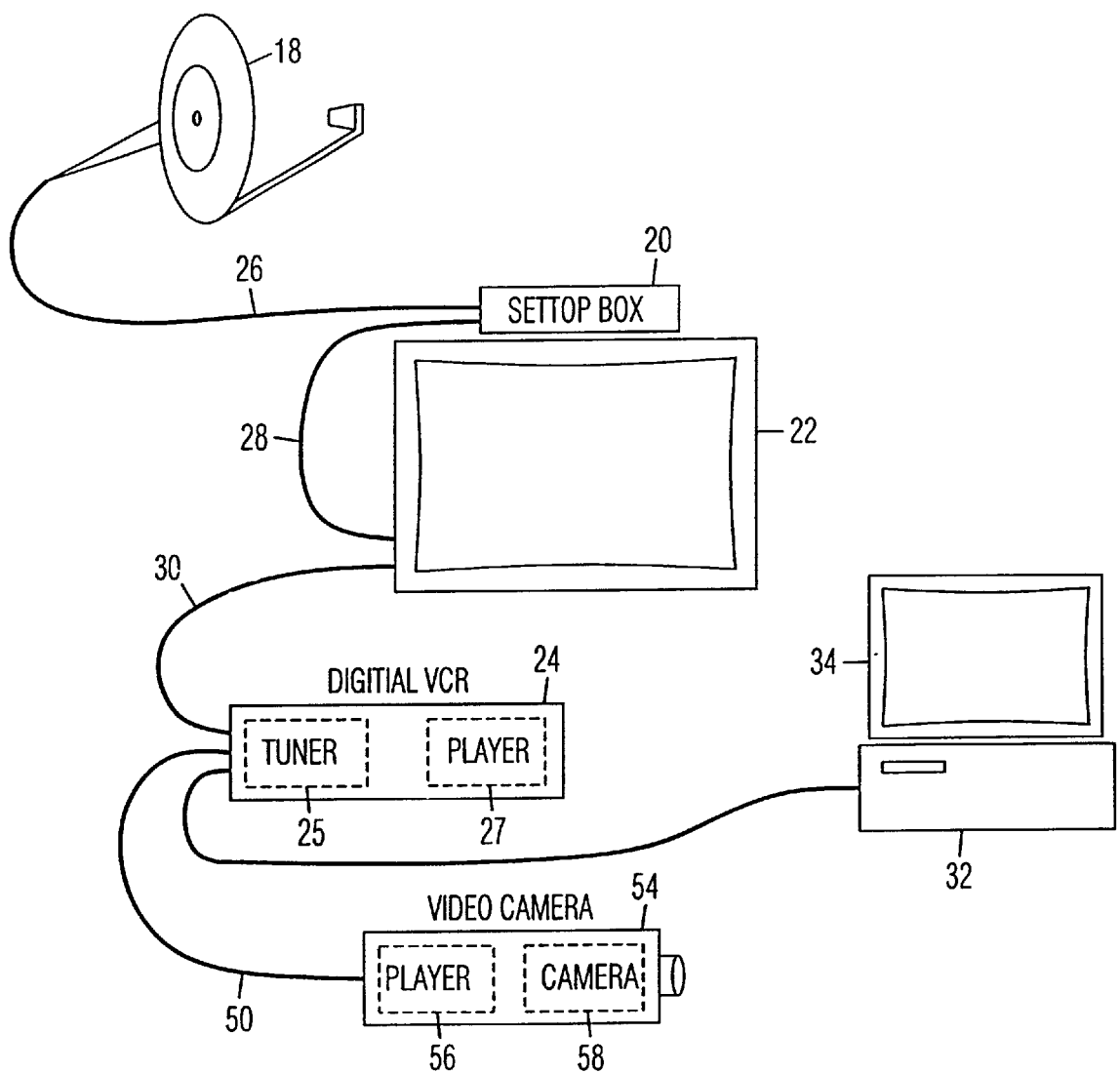
FIG. 6 illustrates an exemplary IEEE 1394-1995 serial bus network including a satellite dish, settop box, television, digital VCR, computer system and a video camera.

An example of the operation of the controlling application after a bus reset, utilizing the dynamic enumeration method illustrated in FIG. 4 and the dynamic binding method illustrated in FIG. 5, will be discussed with reference to the exemplary network of devices illustrated in FIG. 6. The exemplary network of devices illustrated in FIG. 6 is the same as the network of devices illustrated in FIG. 2, with the addition of a video camera 54 coupled to the digital VCR 24 by the IEEE 1394-1995 serial bus cable 50. The video camera 54 includes a camera subunit 56 and a video player subunit 58. The tuner subunit 25 and player subunit 27 within the digital VCR 24 are also illustrated in FIG. 6. When the video camera 54 is coupled to the IEEE 1394-1995 network of devices, by plugging the cable 50 into the digital VCR 24 and the video camera 54, a bus reset occurs. Before the bus reset, each of the devices in the network illustrated in FIG. 2 had a physical ID as represented below in Table I.

TABLE I

| Device | Physical ID |
| --- | --- |
| Satellite Dish 18 | 0 |
| Settop Box 20 | 1 |
| Computer System 32 | 2 |
| Digital VCR 24 | 3 |
| Television 22 | 4 |

When the video camera 54 is added to the network, a bus reset occurs and the tree identification process is performed. After the tree identification process is performed, the devices then start the self identifying process. In response to a query from the controlling application, each of the devices sends its self-identifying information, including its unique ID value and its physical ID value over the IEEE 1394-1995 serial bus network. The controlling application after receiving this self-identifying information, then generates the objects for each of the devices as described above, by utilizing subobjects representing each of the subunits. Then a first handle including the unique ID value of the satellite dish 18 is compared to the generated objects. The object corresponding to the satellite dish 18 and having the unique ID value of the satellite dish 18 is found and the pointer value within the first handle is changed to correspond to the address of this object. A second handle including the unique ID value of the settop box 20 is compared to the generated objects. The object corresponding to the settop box 20 and having the unique ID value of the settop box 20 is found and the pointer value within the second handle is changed to correspond to the address of this object. A third handle including the unique ID value of the computer system 32 is compared to the generated objects. The object corresponding to the computer system 32 and having the unique ID value of the computer system 32 is found and the pointer value within the third handle is changed to correspond to the address of this object. A fourth handle including the unique ID value of the digital VCR 24 is compared to the generated objects. The object corresponding to the digital VCR 24 and having the unique ID value of the digital VCR 24 is found and the pointer value within the fourth handle is changed to correspond to the address of this object. A fifth handle including the unique ID value of the television 22 is compared to the generated objects. The object corresponding to the television 22 and having the unique ID value of the television 22 is found and the pointer value within the fifth handle is changed to correspond to the address of this object. It is then determined that all existing handles have been utilized and the video camera 54 is not yet associated with any handle. Accordingly, a new handle is generated and associated with the video camera 54 by including a pointer value corresponding to the address of the object representing the video camera 54.

One method of updating information about the bus configuration after a bus reset event is to discard all of the handles after the bus reset. The handles and objects then must be re-generated for the nodes included within the IEEE 1394-1995 serial bus network after the bus reset event. This method is inefficient and requires the controlling application to re-generate a handle for each device coupled to the IEEE 1394-1995 serial bus network. Instead of discarding the representations from the existing bus structure, the controlling application of the present invention utilizes the existing handles, as appropriate, to reconfigure the objects and handles to represent the nodes coupled to the IEEE 1394-1995 serial bus network after the bus reset. During the self-identifying process, information about the characteristics of the devices within the network is received. From this self-identifying information, objects representing the devices are generated. Existing handle objects from the previous bus configuration are then compared to these objects. If a handle matches an object, then a pointer value within the handle is changed to point to an address of the object. Preferably, a handle includes a 64 bit unique ID value that is compared to unique ID values within the generated objects to find a match. For devices removed from the network, the handle object is preferably never discarded but is made invalid. For devices added to the network, existing invalid handle objects are preferably re-validated and attached to objects representing devices. If there are no further existing handles and a device does not yet have an attached handle, then a handle is generated and associated with the device. In this manner, the objects and handles for the devices within the network are assembled after a bus reset event, without requiring re-generation of a handle for each and every device.

Subobjects for each subunit within a device are assembled into an object representing the device. When the device reports its self-identifying information, it is determined which subunits are included within the unit. Subobjects representing these subunits are copied from a subobject library and assembled into the object representing this unit. In this manner, objects are generated for units of many different configurations, including units which do not yet exist at the time of the development of the controlling application.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is used with an IEEE 1394-1995 serial bus structure, the present invention could also be implemented on any other appropriate bus structures.

We claim:

1. A method of dynamically enumerating devices within a network comprising:
 a. comparing self identifying information for each device within the network to one or more existing handle objects; and
 b. reconfiguring the existing handle objects to correspond to the devices within the network after a bus reset, wherein valid handle objects are associated with device objects generated after the bus reset.

2. The method as claimed in claim 1 wherein the valid handle objects each include a pointer value pointing to an address of a corresponding device object after the bus reset.

3. The method as claimed in claim 2 wherein each device object represents characteristics of a corresponding device.

4. The method as claimed in claim 3 further comprising receiving self identifying information for each device within the network.

5. The method as claimed in claim 4 further comprising generating the device objects for each device within the network.

6. The method as claimed in claim 5 wherein the network is an IEEE 1394 serial bus network.

7. An apparatus for dynamically enumerating devices within a network comprising:
 a. means for comparing self identifying information for each device within the network to one or more existing handle objects; and
 b. means for reconfiguring coupled to the means for comparing for reconfiguring the existing handle objects to correspond to the devices within the network after a bus reset, wherein valid handle objects are associated with device objects generated after the bus reset.

8. The apparatus as claimed in claim 7 further comprising an interface circuit coupled to the means for comparing to receive the self identifying information from the devices within the network.

9. The apparatus as claimed in claim 8 wherein each handle includes a pointer value corresponding to an address of a corresponding device object.

10. The apparatus as claimed in claim 9 wherein each device object represents characteristics of a corresponding device.

11. The apparatus as claimed in claim 10 wherein the network is an IEEE 1394 serial bus network.

12. A network comprising:
 a. a plurality of devices coupled together, each of the devices including:
  i. an interface circuit through which communications are transmitted and received;
  ii. a processing circuit coupled to the interface circuit to process communications received through the interface circuit; and
 b. a control application resident on one of the devices to maintain representations of the devices, wherein the representations are reconfigured by the control application after a bus reset using existing handles existing before the bus reset which correspond to devices remaining after the bus reset.

13. The network as claimed in claim 12 wherein the representations include device objects each representing characteristics of a corresponding device.

14. The network as claimed in claim 13 wherein each handle includes a pointer value corresponding to an address of a corresponding device object.

15. The network as claimed in claim 14 wherein the network is an IEEE 1394 serial bus network.

16. A method of dynamically enumerating devices within a network comprising:
 a. determining characteristics of a device;
 b. generating a device object for the device;
 c. determining if an existing valid handle matches the characteristics of the device, wherein the existing valid handle includes a pointer value; and
 d. changing the pointer value to an address of the device object if the existing valid handle matches the characteristics of the device.

17. The method as claimed in claim 16 wherein the existing valid handle further includes a unique ID value of the device.

18. The method as claimed in claim 17 wherein determining if any existing valid handle matches the characteristics of the device compares the unique ID value of the device to the unique ID value stored in the handle.

19. The method as claimed in claim 18 further comprising repeating a–d for each device within the network.

20. The method as claimed in claim 19 wherein for a new device added to the network, an existing invalid handle is re-validated and associated with a corresponding device object, if the existing invalid handle is available.

21. The method as claimed in claim 20 wherein if no existing invalid handle is available, a new handle is generated for and associated with the new device.

22. The method as claimed in claim 21 wherein for a device removed from the network, a corresponding handle is changed to an invalid handle.

23. The method as claimed in claim 22 wherein each device object represents characteristics of a corresponding device.

24. The method as claimed in claim 23 further comprising receiving self-identifying information for the device.

25. The method as claimed in claim 24 wherein the network is an IEEE 1394 serial bus network.

* * * * *

UNITED STATES PATENT AND TRADEMARK OFFICE
CERTIFICATE OF CORRECTION

PATENT NO. : 6,366,964 B1  Page 1 of 1
DATED : April 2, 2002
INVENTOR(S) : Hisato Shima et al.

It is certified that error appears in the above-identified patent and that said Letters Patent is hereby corrected as shown below:

<u>Title page,</u>
Item [54], delete "NETWORKING" and insert -- NETWORK --.
Item [56] References Cited, U.S. PATENT DOCUMENTS,
Insert -- 5,734,852  A  3/1998  Zias et al.  …………..395/334 --;
Insert -- 6,009,476  A  12/1999  Flory et al.  …………..709/301 --; and
Insert -- 6,138,269  A  10/2000  Ball et al.  …………..717/2 --.

Signed and Sealed this

Seventeenth Day of September, 2002

*Attest:*

*Attesting Officer*

JAMES E. ROGAN
*Director of the United States Patent and Trademark Office*